(12) United States Patent
DeRosa (10) Patent No.: US 7,023,652 B1
(45) Date of Patent: Apr. 4, 2006

(54) SEEKING A TRANSDUCER WITH A CURRENT COMMAND REGULATED BASED ON TRANSDUCER LOCATION AND ADDRESSED DATA BLOCK

(75) Inventor: Jeffrey V. DeRosa, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/894,997

(22) Filed: Jul. 20, 2004

Related U.S. Application Data (60) Provisional application No. 60/559,551, filed on Apr. 5, 2004.

(51) Int. Cl.
*G11B 5/596* (2006.01)
(52) U.S. Cl. .................................. 360/78.04
(58) Field of Classification Search ............. None
See application file for complete search history.

(56) References Cited

U.S. PATENT DOCUMENTS

| | | | |
|---|---|---|---|
| 6,260,108 B1 * | 7/2001 | Barve et al. ................ 711/112 |
| 6,310,743 B1 | 10/2001 | Haines et al. ............ 360/78.07 |
| 6,510,019 B1 | 1/2003 | DeRosa ................... 360/78.06 |
| 6,515,819 B1 | 2/2003 | Schmidt et al. .......... 360/78.04 |
| 6,570,733 B1 | 5/2003 | Waugh et al. ........... 360/78.06 |
| 6,597,529 B1 | 7/2003 | DeRosa ................... 360/78.14 |
| 6,624,964 B1 * | 9/2003 | Pirzadeh ................. 360/78.07 |

* cited by examiner

*Primary Examiner*—David Hudspeth
*Assistant Examiner*—Mitchell Slavitt
(74) *Attorney, Agent, or Firm*—Myers Bigel Sibley & Sajovec, PA (57) ABSTRACT

A transducer is moved in a seek operation from an initial track to a target track on a disk based on a current command. The current command is regulated based on a location of the transducer and a location of an addressed data block on the disk. The current command may be regulated so that the transducer settles on the target track a predetermined time before the addressed data block reaches the transducer.

16 Claims, 5 Drawing Sheets

SEEKING A TRANSDUCER WITH A CURRENT COMMAND REGULATED BASED ON TRANSDUCER LOCATION AND ADDRESSED DATA BLOCK

RELATED APPLICATION

This application claims the benefit of and priority to U.S. Provisional Patent Application No. 60/559,551 titled "JUST-IN-TIME SEEKING", filed Apr. 5, 2004, the disclosure of which is hereby incorporated herein by reference as if set forth in its entirety.

FIELD OF THE INVENTION

The present invention generally relates to digital data storage devices and, more particularly, to methods, apparatus, and computer program products for seeking a transducer between tracks on a disk in a disk drive.

BACKGROUND OF THE INVENTION

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and are can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a selected settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, the forces that can be exerted on the actuator to obtain minimum average seek times can cause vibration of the actuator and the disk drive, and can result in a decrease in the seek performance and undesirable acoustical noise.

SUMMARY OF THE INVENTION

Some embodiments of the present invention provide methods of controlling seeking of a transducer that is adjacent to a rotatable disk in a disk drive. The transducer is moved in a seek operation from an initial track to a target track on the disk based on a current command. The current command is regulated based on a location of the transducer and a location of an addressed data block on the disk. In some further embodiments of the present invention, the current command is regulated so that the transducer settles on the target track a predetermined time before the addressed data block reaches the transducer. Accordingly, the seek operation may be slowed down, which may reduce noise and vibration, and may improve seek performance and off-track writing of data.

In some further embodiments of the present invention, an expected seek time and an expected rotational latency time can be determined based on the location of the transducer and the location of an addressed data block. The expected seek time can be determined based on the initial track and the target track. The expected rotational latency time can be determined based on an expected location of the transducer after seeking to the target track and based on the location of the addressed data block. The current command can be regulated based on the expected rotational latency time and the expected seek time.

In some further embodiments of the present invention, the current command can be regulated by determining a maximum current based on the initial track and the target track, scaling the maximum current to generate a scaled maximum current based on the expected rotational latency time and the expected seek time, and constraining the current command to no more than the scaled maximum current. The scaled maximum current may be generated by determining a scaling ratio based a ratio of the expected rotational latency time to the expected seek time, determining a scale factor based on the equation:

$$\text{scale factor} = \frac{\text{tuning gain}}{\text{scaling ratio} + \text{tuning gain}},$$

where tuning gain is a predetermined number less than 1, and by combining the scale factor and the maximum current command to generate the scaled maximum current.

Some other embodiments of the present invention provide an apparatus that controls the seeking of a transducer that is adjacent to a rotatable disk in a disk drive. The apparatus includes a servo controller that is configured to seek the transducer from an initial track to a target track on the disk based on a current command, and configured to regulate the current command based on a location of the transducer and a location of an addressed data block on the disk. In some further embodiments of the present invention, the servo controller is configured to regulate the current command so that the transducer settles on the target track a predetermined time before the addressed data block reaches the transducer.

In some further embodiments of the present invention, the servo controller can be configured to determine an expected seek time and an expected rotational latency time based on the location of the transducer and the location of an addressed data block, and can regulate the current command based on the expected rotational and seek times. The expected seek time can be determined based on the initial track and the target track. The expected rotational latency time can be determined based on an expected location of the transducer after seeking to the target track and based on the location of the addressed data block.

In some further embodiments of the present invention, the servo controller can include a location detector and a seek and rotational time estimator. The location detector can be configured to detect location of the transducer relative to tracks on the disk and data blocks within tracks. The seek and rotational time estimator can be configured to determine the expected seek time based on the initial track and the target track, and configured to determine the expected rotational latency time based on an expected location of the transducer after seeking to the target track and based on the location of the addressed data block.

In some further embodiments of the present invention, the servo controller can include a maximum current determination unit, a scaler, and a current regulator. The maximum current determination unit can be configured to determine a maximum current based on the initial track and the target track. The scaler can be is configured to scale the maximum current to generate a scaled maximum current based on the expected rotational latency time and the expected seek time. The current regulator can be configured to constrain the current command to no more than the scaled maximum current. The scaled maximum current can be generated by determining a scaling ratio based a ratio of the expected rotational latency time to the expected seek time, determining a scale factor based on the following equation:

$$\text{scale factor} = \frac{\text{tuning gain}}{\text{scaling ratio} + \text{tuning gain}},$$

where tuning gain is a predetermined number less than 1, and combining the scale factor and the maximum current command to generate the scaled maximum current.

Some other embodiments of the present invention provide a computer program product for controlling seeking of a transducer that is adjacent to a rotatable disk in a disk drive. The computer program product includes computer program code that is configured to seek the transducer from an initial track to a target track on the disk based on a current command, and computer program code that is configured to regulate the current command based on a location of the transducer and a location of an addressed data block on the disk. In some further embodiments of the present invention, the computer program code that is configured to regulate the current command can be configured to regulate the current command so that the transducer settles on the target track a predetermined time before the addressed data block reaches the transducer.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disk read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
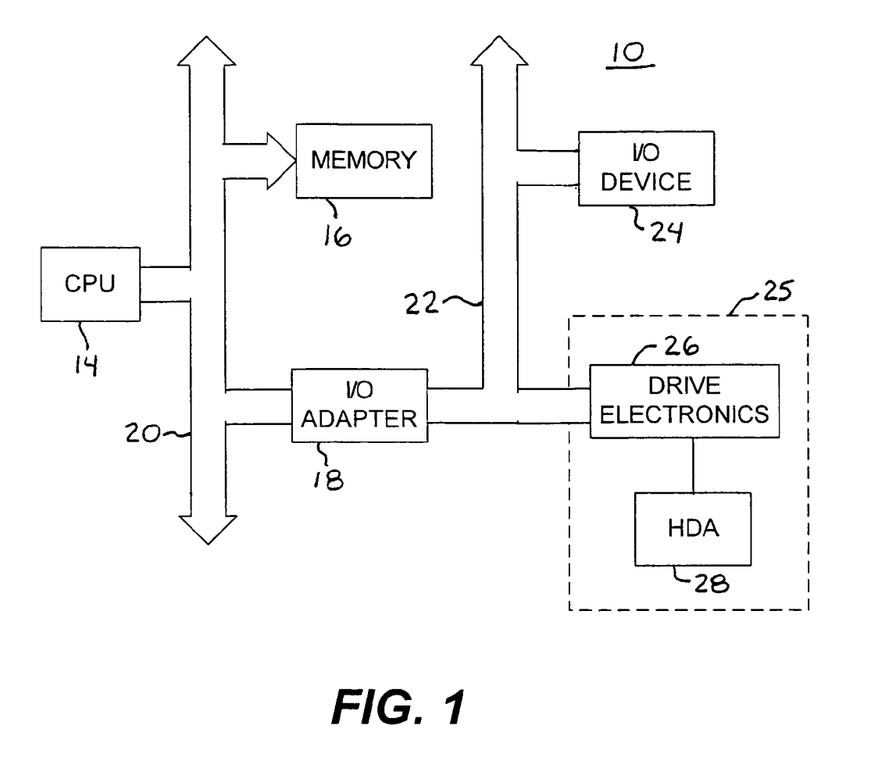
FIG. 1 is a block diagram of an exemplary computer system that includes a disk drive.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
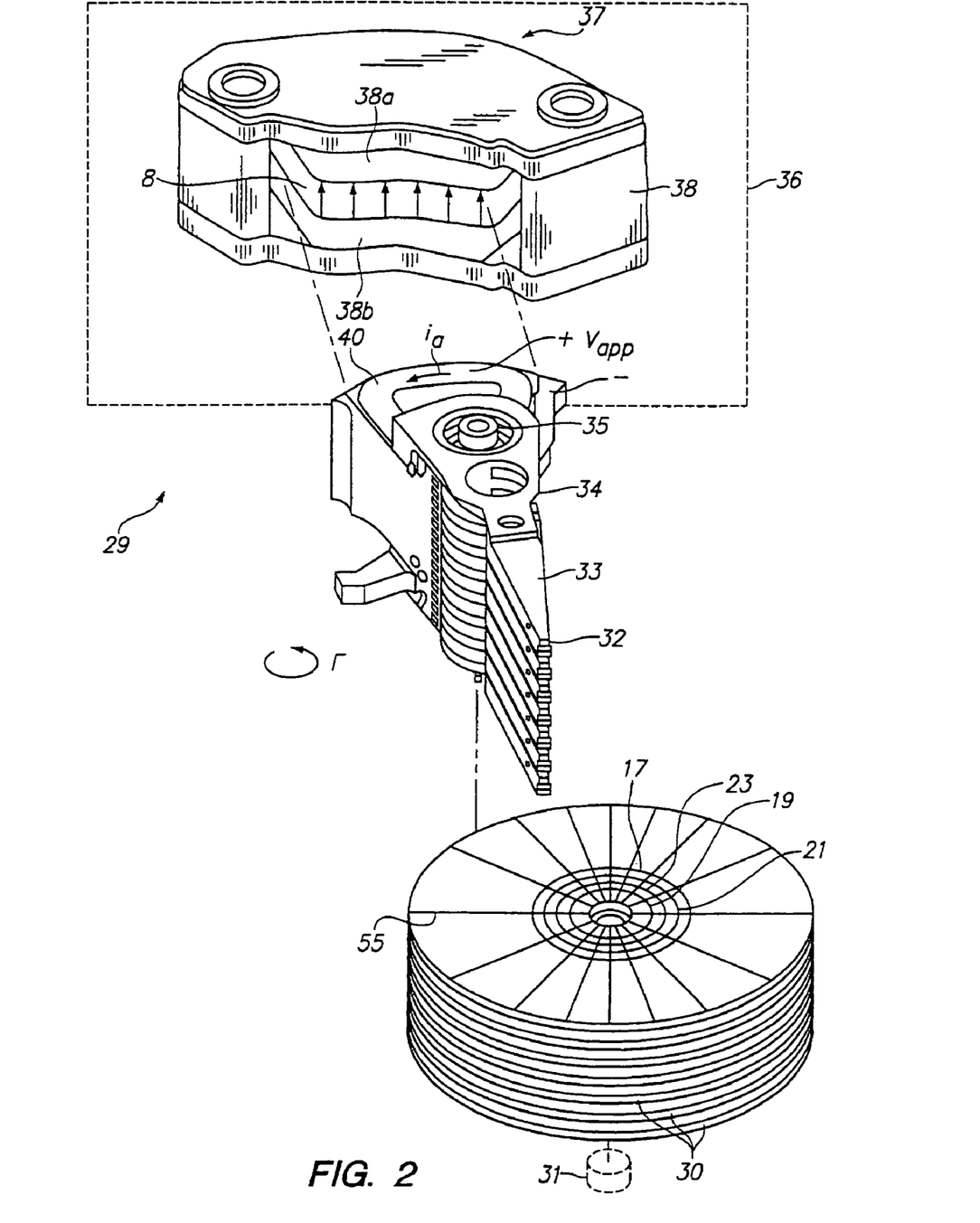
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in proportion to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current $i_a$ is induced in the coil 40 disposed in the magnetic field B, a torque is produced on the actuator arms 34 resulting in radial motion of the arms 34 about pivot point 35. The polarity of the input actuator current $i_a$ determines the direction of radial motion of the actuator arms 34.

Figure 3:
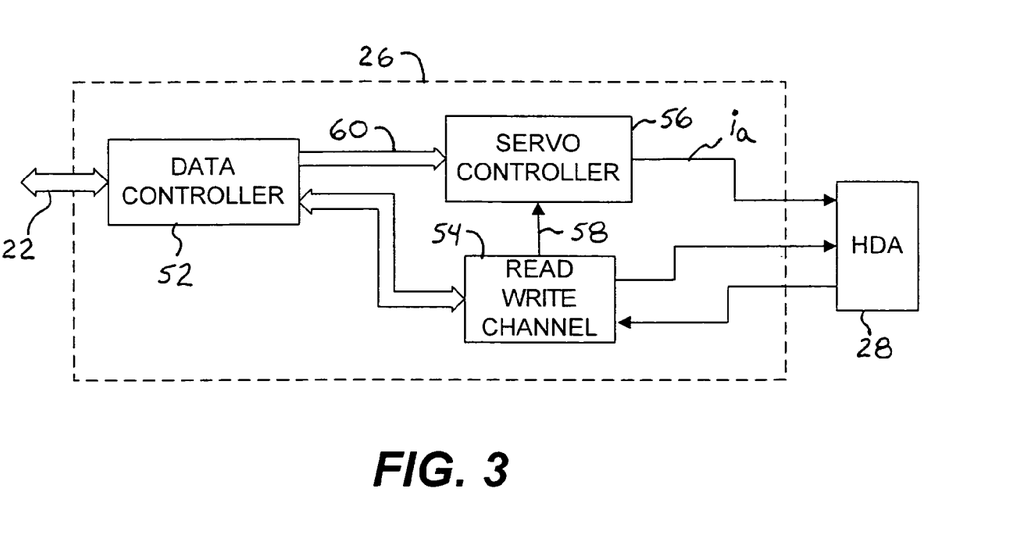
FIG. 3 is a block diagram of the drive electronics of the disk drive according to some embodiments of the present invention.

Referring to FIG. 3, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command that is converted into the input actuator current $i_a$, and provided to the actuator 29 to radially move the transducer 32 across the disk 30. The seek time thereby dependent on the magnitude of the current command.

The time required to rotate the disk 30 to perform a particular data access can be referred to as "rotational time." The rotational time can be the time required to rotate from a current position to a desired position on the disk 30. Thus, the rotational time may be as great as the time required for one revolution of the disk 30. The rotational time is dependent on the revolutions per minute (RPM) of the disk 30. Generally, the total time to access an addressed data block on the disk 30 is about equal to the sum of the seek time, the rotational time, and the time required to read or write the data.

Figure 5:
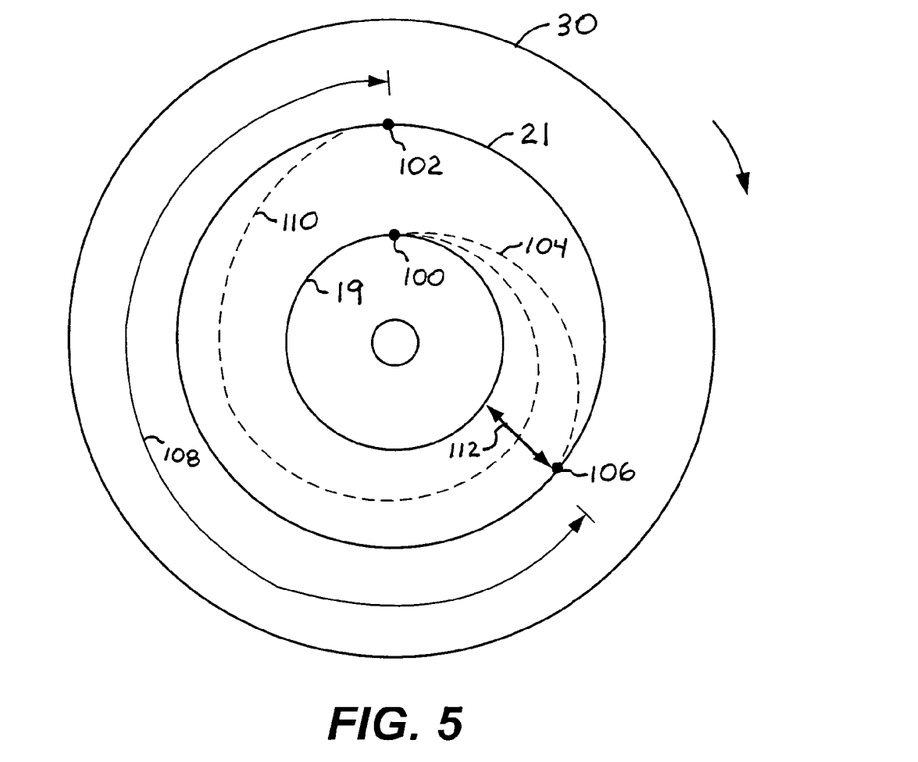
FIG. 5 is a diagram of a disk drive that illustrates a seek operation according to some embodiments of the present invention.

Referring now to FIG. 5, an exemplary one of the disks 30 is shown that illustrates a start location 100 of the transducer 32 (FIG. 2) on the initial track 19, and an addressed data block 102 on the target track 21 to which the CPU 14 has requested access. In one example seek operation, which may correspond to use of a maximum current command that corresponds to saturation of the motor 36, the servo controller 56 may move the transducer 32 along path 104 between the initial track 19 and the target track 21. Strong acceleration and deceleration of the actuator 29 can cause significant noise and vibration of the HDA 29 components, and may cause degraded seek performance and/or off-track writing of data. Accordingly, it may be advantageous to increase the seek time and allow a decrease in the acceleration and deceleration of the actuator 29.

In the exemplary seek operation, after seeking to the target track 21 along path 104, the disk 30 must continue to rotate an angular amount 108 before the transducer 32 reaches the addressed data block 102. According to various embodiments of the present invention, the servo controller 56 regulates the current command based on the location of the transducer 32 and based on a location of the addressed data block 102. For example, the servo controller 56 may regulate the current command so that the transducer 32 reaches the target track 21 a predetermined time before the addressed data block 102 reaches the transducer 32, such as along path 110. The predetermined time may correspond to a typical time for the transducer to settle on the target track 21 following a seek operation.

Figure 4:
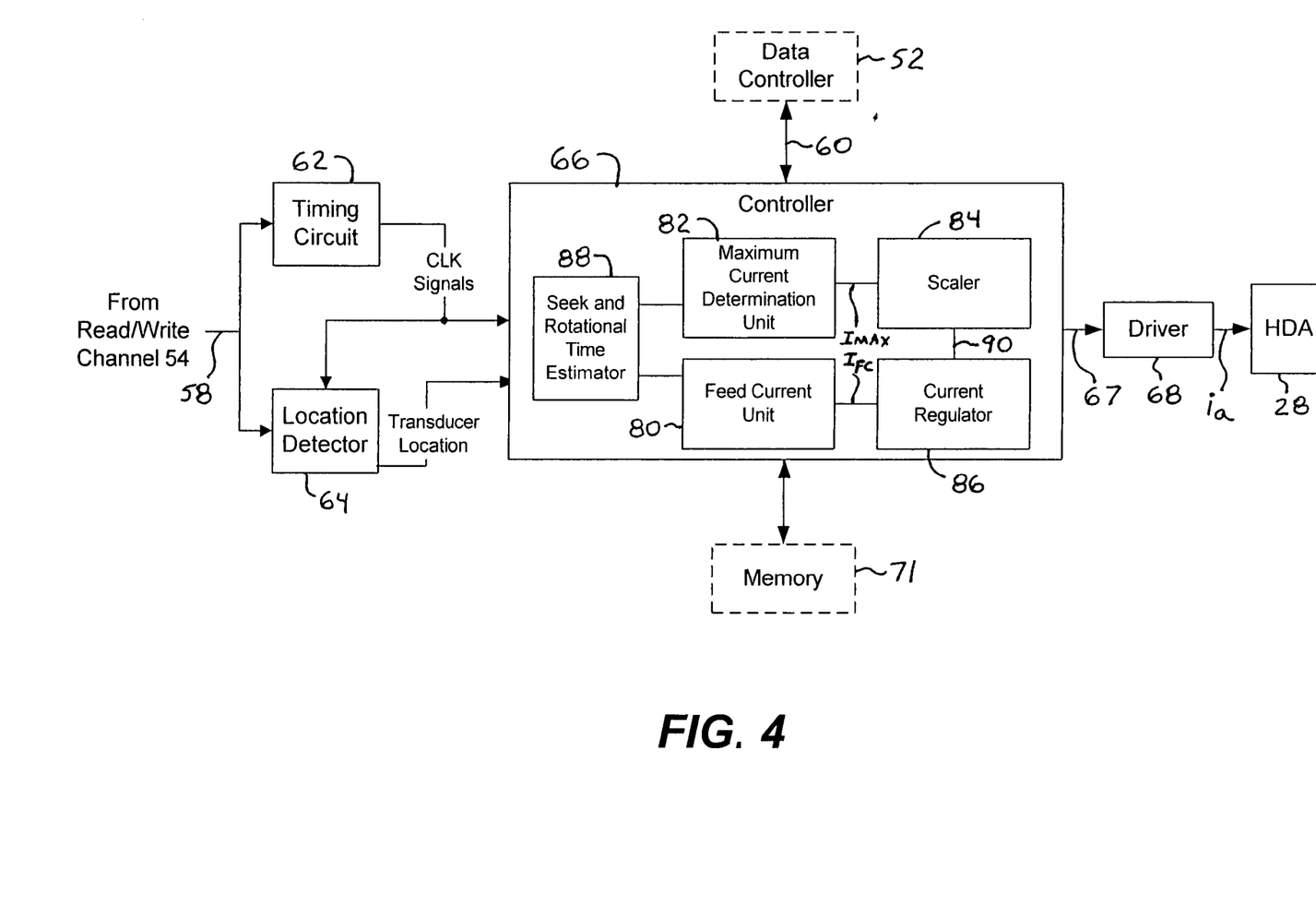
FIG. 4 is a block diagram of the servo controller according to some embodiments of the present invention.

These and other aspects of the servo controller 56 are described with reference now to FIG. 4 in accordance with some embodiments of the present invention. The servo controller 56 can include a timing circuit 62, a location detector 64, a controller 66, and a driver 68. The timing circuit 62 can generate clock signals synchronized with the passage of servo sectors 55 on tracks under the transducer 32. The timing circuit 62 can include a counter and a phase locked loop for generating the clock signals. Based on the clock signals from the timing circuit 62 and transducer location data provided by the read/write channel 54, the location detector 64 detects a location of the transducer 32 relative to tracks on the disk 30 and data blocks within the tracks 17. The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

The controller 66 controls movement and positioning of the transducer 32 during seek operations. In response to clock signals from the timing circuit 62, where each clock signal indicates passage of a servo sector 55 under the transducer 32. The controller 66 obtains the transducer location information from the location detector 64. The controller 66 can include a feed current unit 80, a maximum current determination unit 82, a scaler 84, a current regulator 86, and a seek and rotational time estimator 88.

The seek and rotational time estimator 88 determines an expected seek time and expected rotational latency time based on the location of the transducer 32 and the location of the addressed data block 102. The expected seek time may be determined based on the initial track 19 and the target track 21. For example, the expected seek time may be selected from among a table of a plurality of seek distances (e.g., number of tracks from the initial track 19 to the target track 21) and corresponding expected seek times. Such a table of seek distances and expected seek times may, for example, have common values that are used in multiple disk drives, rather than unique to each model of disk drive and/or a particular one of the disk drives. A seek distance 112 between the initial track 19 and the target track 21 is shown in FIG. 5. The expected rotational latency time may be determined based on an expected location of the transducer 32 after seeking to the target track 21 and based on the location of the addressed data block 102 (e.g., the expected rotation latency time corresponding to the angular amount 108).

The feed current unit 80 generates a feed current $I_{FC}$ based on the expected seek time (i.e., based on the seek distance). For example, the feed current $I_{FC}$ may be selected from among a table of a plurality of feed currents and corresponding expected seek times. In another example, the feed current $I_{FC}$ may be determined based on a feed current profile that provides a feed current $I_{FC}$ that varies based on distance from the target track.

The maximum current determination unit 82 is configured to determine a maximum current $I_{MAX}$, which may determined based on the initial track 19 and the target track 21 (i.e., the seek distance 112). For example, the maximum current $I_{MAX}$ may be selected from among a table of a plurality of maximum currents and corresponding expected seek times. The maximum current $I_{MAX}$ may correspond to a level of the input actuator current $i_a$ where the actuator 29 becomes saturated. The scaler 84 scales the maximum current $I_{MAX}$ to generate a scaled maximum current 90 based on the expected rotational latency time and the expected seek time. The current regulator 86 is configured to regulate the feed current $I_{FC}$ based on the scaled maximum current 90 to generate a regulated current command 67. For example, the current regulator 86 may limit the feed current $I_{FC}$ to no more than the scaled maximum current 90. Accordingly, the scaler 84 and current regulator 86 can slow down a seek operation so that the transducer 32 can settle on the target track 21 a predetermined time before the addressed data block 102 reaches the transducer 32. In this manner, instead of the transducer 32 following the seek path 104 based on the feed command $I_{FC}$, it may instead follow the seek path 110 based on the regulated current command 67.

Figure 6:
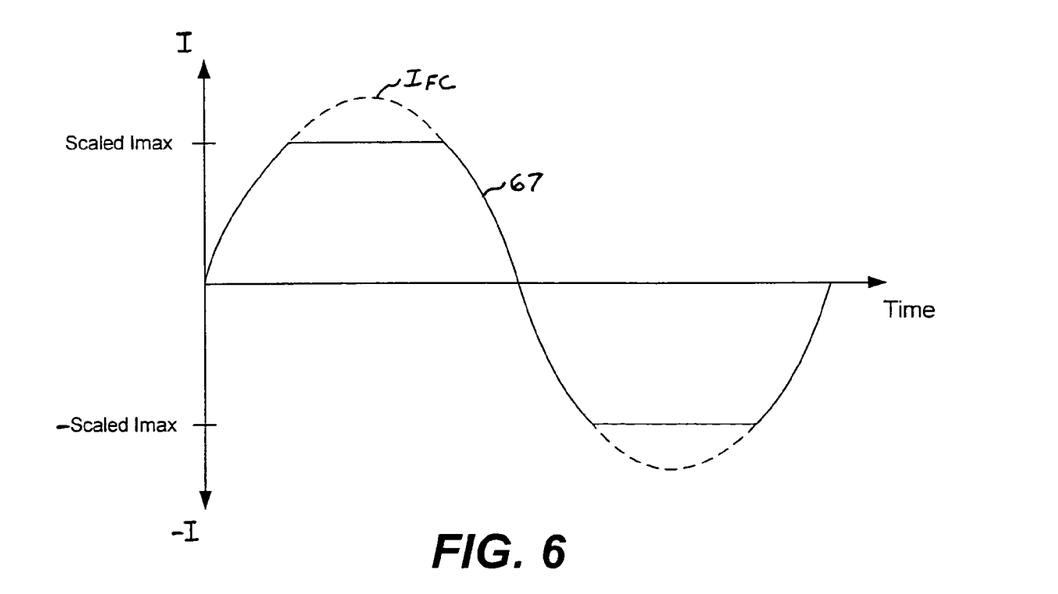
FIG. 6 is a graph of a seek operation current command that is regulated according to some embodiments of the present invention.

FIG. 6 is a graph showing an exemplary unregulated feed current $I_{FC}$ and regulated current command 67. The regulated current command 67 is constrained to be no more than the scaled maximum current 90. The portion of the unregulated feed current $I_{FC}$ that is constrained in the regulated current command 67 is represented by the dashed lines.

The scaler 84 may be configured to determine a scaling ratio based a ratio of the expected rotational latency time to the expected seek time, and determine a scale factor based on the following equation:

$$\text{scale factor} = \frac{\text{tuning gain}}{\text{scaling ratio} + \text{tuning gain}}$$

The tuning gain is a predetermined number less than 1, such as, for example, 0.25. The scaler may then combine (e.g., multiply) the scale factor and the maximum current command to generate the scaled maximum current 90. For short seek operations, the scaling ratio can be a very small number (e.g., approaches zero) such that the scale factor approaches one. Consequently, for short seek operations, the current regulator 86 may provide little if any constraint on the feed current $I_{FC}$, such that the regulated current command 67 is about equal to the feed current $I_{FC}$. In contrast, the feed current $I_{FC}$ may be substantially regulated for long seek operations.

In one exemplary embodiment, for a HDA 28 that has 10 K RPM disks 30 with a random workload (i.e., no command reordering), the average rotational latency time will be about 3 milliseconds, corresponding to an average of one half of a revolution of the disks 30. The average seek operation may be assumed to ⅓ of the available stroke (i.e., between the innermost and outermost tracks), and correspond to a seek time of 4.0 milliseconds. The tuning gain is assumed to be 0.25. Accordingly, the average scale factor used to generate the scaled maximum current 90 from the maximum current $I_{MAX}$ is 0.25 (i.e., scale factor=0.25/(3.0/4.0+0.25)). The regulated current command 67 will therefore have a peak current that is reduced by 75%. In a variation of the exemplary embodiment, an input/output operation that has a rotational latency of a full revolution of the disks 30 will have a rotational latency time of about 6 milliseconds, and a corresponding scale factor of 0.14 (i.e., scale factor=0.25/(6.0/4.0+0.25)). The regulated current command 67 will therefore have a peak current that is reduced by 86%. The seek operation is thereby slowed down, which may reduce noise and vibration that may be caused in the HDA 29 components, and may improve the seek performance and/or off-track writing of data.

The regulated current command 67 generated by the controller 66 is provided to the driver 80. The driver 80 combines (e.g., multiplies) the regulated current command 67 and a gain value to generate the input actuator current $i_a$, which is provided to the HDA 28 (i.e., actuator 29). When the input actuator current $i_a$ is applied to the motor 36 (FIG. 2), the transducer 32 can move radially inward or radially outward in a seek operation.

Figure 7:
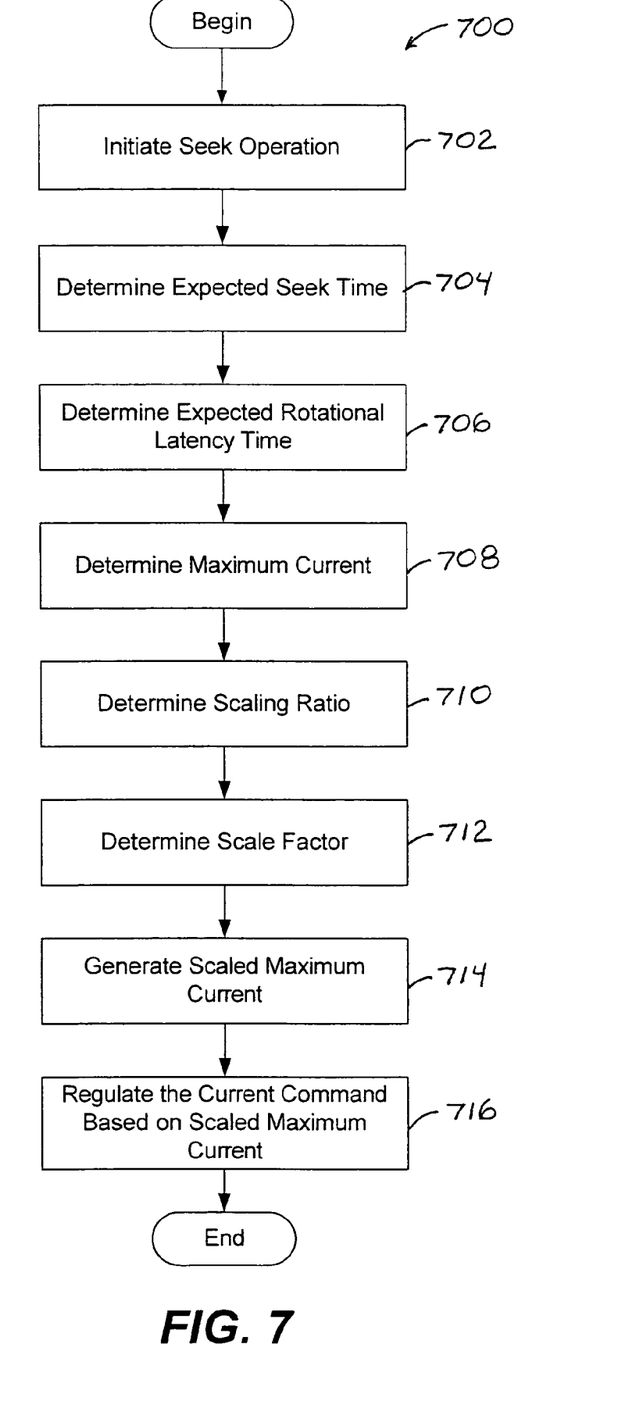
FIG. 7 is a flowchart showing a process for controlling seeking of a transducer by a current command that is regulated based on a transducer location and an addressed data block.

FIG. 7 is a flowchart of operations of a process 700 for controlling seeking of a transducer by a current command that is regulated according to some embodiments of the present invention. The process 700 may be performed by the servo controller 56 shown in FIG. 3. At Block 702, a seek operation that seeks the transducer from an initial track to a target track is initiated. At Block 704, an expected seek time is determined by, for example, selecting the seek time from among a plurality of seek times based on the seek distance between the initial and final tracks. At Block 706, an expected rotational latency time is determined based on, for example, an expected location of the transducer after seeking to the target track and based on the location of an addressed data block. At Block 708, a maximum current is determined by, for example, selecting the maximum current from among a plurality of maximum currents based on the expected seek time. At Block 710, a scaling ratio is determined based on a ratio of the expected rotational latency time to the expected seek time. At Block 712, a scale factor is determined based on, for example, a ratio of the tuning gain divided by the sum of the scaling ratio and the tuning gain. At Block 714, a scaled maximum current is generated based on the determined maximum current and the scaling ratio. At Block 716, the current command that is used to seek the transducer is regulated based on the scaled maximum current.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of controlling seeking of a transducer that is adjacent to a rotatable disk in a disk drive, the method comprising:
    seeking the transducer from an initial track to a target track on the disk based on a current command;
    regulating the current command based on a location of the transducer and a location of an addressed data block on the disk; and
    determining an expected seek time and an expected rotational latency time based on the location of the transducer and the location of an addressed data block, wherein regulating the current command comprises regulating the current command based on the expected rotational latency time and the expected seek time,
    wherein determining an expected seek time and an expected rotational latency time comprises:
    determining the expected seek time based on the initial track and the target track; and
    determining the expected rotational latency time based on an expected location of the transducer after seeking to the target track and based on the location of the addressed data block, and
    wherein determining the expected seek time comprises selecting the expected seek time from among a plurality of expected seek times based on the initial track and the target track.

2. A method of controlling seeking of a transducer that is adjacent to a rotatable disk in a disk drive, the method comprising:
    seeking the transducer from an initial track to a target track on the disk based on a current command;
    regulating the current command based on a location of the transducer and a location of an addressed data block on the disk;
    determining an expected seek time and an expected rotational latency time based on the location of the transducer and the location of an addressed data block, wherein regulating the current command comprises regulating the current command based on the expected rotational latency time and the expected seek time;
    determining a maximum current based on the initial track and the target track; and
    scaling the maximum current to generate a scaled maximum current based on the expected rotational latency time and the expected seek time, wherein regulating the current command comprises constraining the current command to no more than the scaled maximum current.

3. The method of claim 2, wherein regulating the current command comprises regulating the current command so that the transducer settles on the target track a predetermined time before the addressed data block reaches the transducer.

4. The method of claim 2, wherein determining a maximum current comprises selecting the maximum current from among a plurality of maximum currents based on the initial track and the target track.

5. The method of claim 2, wherein scaling the maximum current comprises:
    determining a scaling ratio based a ratio of the expected rotational latency time to the expected seek time;
    determining a scale factor based on the following equation, $$\text{scale factor} = \frac{\text{tuning gain}}{\text{scaling ratio} + \text{tuning gain}}$$

wherein tuning gain is a predetermined number less than 1; and
    combining the scale factor and the maximum current command to generate the scaled maximum current.

6. An apparatus for controlling seeking of a transducer that is adjacent to a rotatable disk in a disk drive, the servo controller comprising:
    a servo controller that is configured to seek the transducer from an initial track to a target track on the disk based on a current command, configured to regulate the current command based on a location of the transducer and a location of an addressed data block on the disk, configured to determine an expected seek time and an expected rotational latency time based on the location of the transducer and the location of an addressed data block, configured to regulate the current command based on the expected rotational latency time and the expected seek time, configured to determine the expected seek time based on the initial track and the target track, and configured to determine the expected rotational latency time based on an expected location of the transducer after seeking to the target track and based on the location of the addressed data block, and wherein the servo controller comprises:
    a location detector that is configured to detect location of the transducer relative to tracks on the disk and data blocks within tracks; and
    a seek and rotational time estimator that is configured to determine the expected seek time based on the initial track and the target track, configured to determine the expected rotational latency time based on an expected location of the transducer after seeking to the target track and based on the location of the addressed data block, and configured to select the expected seek time from among a plurality of expected seek times based on the initial track and the target track.

7. An apparatus for controlling seeking of a transducer that is adjacent to a rotatable disk in a disk drive, the servo controller comprising:

a servo controller that is configured to seek the transducer from an initial track to a target track on the disk based on a current command, configured to regulate the current command based on a location of the transducer and a location of an addressed data block on the disk, configured to determine an expected seek time and an expected rotational latency time based on the location of the transducer and the location of an addressed data block, configured to regulate the current command based on the expected rotational latency time and the expected seek time, configured to determine a maximum current based on the initial track and the target track, configured to scale the maximum current to generate a scaled maximum current based on the expected rotational latency time and the expected seek time, and configured to constrain the current command to no more than the scaled maximum current.

8. The apparatus of claim 7, wherein the servo controller is further configured to regulate the current command so that the transducer settles on the target track a predetermined time before the addressed data block reaches the transducer.

9. The apparatus of claim 7, wherein the servo controller is further configured to select the maximum current from among a plurality of maximum currents based on the initial track and the target track.

10. The apparatus of claim 7, wherein the servo controller is further configured to determine a scaling ratio based a ratio of the expected rotational latency time to the expected seek time, configured to determine a scale factor based the following equation:

$$\text{scale factor} = \frac{\text{tuning gain}}{\text{scaling ratio} + \text{tuning gain}},$$

wherein tuning gain is a predetermined number less than 1, and configured to combine the scale factor and the maximum current command to generate the scaled maximum current.

11. The apparatus of claim 7, further comprising:

a driver that is configured to generate an input actuator current based on the current command that is constrained to no more than the scaled maximum current and based on a gain value; and a motor that is configured to move the actuator based on the input actuator current.

12. An apparatus for controlling seeking of a transducer that is adjacent to a rotatable disk in a disk drive, the servo controller comprising:

a servo controller that is configured to seek the transducer from an initial track to a target track on the disk based on a current command, configured to regulate the current command based on a location of the transducer and a location of an addressed data block on the disk, configured to determine an expected seek time and an expected rotational latency time based on the location of the transducer and the location of an addressed data block, configured to regulate the current command based on the expected rotational latency time and the expected seek time, wherein the servo controller comprises:

a seek and rotational time estimator that is configured to determine the expected seek time based on the initial track and the target track, and configured to determine the expected rotational latency time based on an expected location of the transducer after seeking to the target track and based on the location of the addressed data block;

a maximum current determination unit that is configured to determine a maximum current based on the initial track and the target track;

a scaler that is configured to scale the maximum current to generate a scaled maximum current based on the expected rotational latency time and the expected seek time; and a current regulator that is configured to constrain the current command to no more than the scaled maximum current.

13. The apparatus of claim 12, wherein the maximum current determination unit is configured to select the maximum current from among a plurality of maximum currents based on the initial track and the target track.

14. The apparatus of claim 12, wherein the scaler is configured to determine a scaling ratio based a ratio of the expected rotational latency time to the expected seek time, configured to determining a scale factor based the following equation:

$$\text{scale factor} = \frac{\text{tuning gain}}{\text{scaling ratio} + \text{tuning gain}}$$

wherein tuning gain is a predetermined number less than 1, and configured to combine the scale factor and the maximum current command to generate the scaled maximum current.

15. A computer program product for controlling seeking of a transducer that is adjacent to a rotatable disk in a disk drive, the computer program product comprising computer program code embodied in a computer-readable storage medium, the computer program code comprising:

computer program code that is configured to seek the transducer from an initial track to a target track on the disk based on a current command;

computer program code that is configured to regulate the current command based on a location of the transducer and a location of an addressed data block on the disk:

computer program code that is configured to determine an expected seek time and an expected rotational latency time based on the location of the transducer and the location of an addressed data block, wherein the computer program code that is configured to regulate the current command is configured to regulate the current command based on the expected rotational latency time and the expected seek time;

computer program code that is configured to determine a maximum current based on the initial track and the target track; and computer program code that is configured to scale the maximum current to generate a scaled maximum current based on the expected rotational latency time and the expected seek time, wherein the computer program code that is configured to regulate the current command is configured to constrain the current command to no more than the scaled maximum current.

16. The computer program product of claim 15, wherein the computer program code that is configured to regulate the current command is configured to regulate the current command so that the transducer settles on the target track a predetermined time before the addressed data block reaches the transducer.

* * * * *